Oct. 28, 1969  J. L. HUTSON  3,475,676
PHOTOSENSITIVE POWER CONTROL SYSTEM
Filed Dec. 28, 1966  2 Sheets-Sheet 1

INVENTOR
JEARLD L. HUTSON

BY Thomas A. Harwood
ATTORNEY

Oct. 28, 1969

J. L. HUTSON 3,475,676

PHOTOSENSITIVE POWER CONTROL SYSTEM

Filed Dec. 28, 1966

INVENTOR
JEARLD L. HUTSON

BY *Thomas A. Harwood*

ATTORNEY

United States Patent Office 3,475,676
Patented Oct. 28, 1969

3,475,676
PHOTOSENSITIVE POWER CONTROL SYSTEM
Jearld L. Hutson, 907 Newberry,
Richardson, Tex. 75080
Filed Dec. 28, 1966, Ser. No. 605,325
Int. Cl. H02p 13/14, 13/16
U.S. Cl. 323—21    11 Claims

ABSTRACT OF THE DISCLOSURE

A system for controlling the power supplied to a load from a source of AC voltage including a semiconductor switch, a regulator including optical means for controlling the flow of current through a photoresponsive means and manually operable means for varying the optical coupling between the optical means and the photoresponsive means, and a charging means which is discharged to generate a trigger signal for the semiconductor switch, which system may be used for motor speed control.

---

This invention relates to a system for controlling the power supplied to a load from a source of alternating voltage and a manual regulator therefor. More particularly, it relates to a power control system that employs a semiconductor power switch which is phase controlled, wherein the system eliminates the necessity of any component of the electrical sliding contact type and employs a manual input for regulating the system.

Electrical power control circuits that employ phase controlled semiconductor power switching devices are commonly used on all descriptions of appliances, power tools, and varied other electrical apparatus requiring control circuits. At one time, production of reliable semiconductor power switch devices with the proper characteristics was considered to be one of the most important cost factors in producing such a control circuit. Recently, however, the cost of manufacturing such devices that adequately perform the desired function has been greatly reduced. Attempts to reduce the cost of such circuits are now directed toward the more conventional electrical components used within the system, such as the sliding electrical contact type components, variable resistors, for example, that are manually operated by the user to control the power supplied to the load. In addition to the cost involved in these type components, it is common knowledge that variable electrical sliding contact resistors have a limited lifetime due to frictional wear. The failure of such components can be attributed directly to the inherent nature of the component, since a sliding contact dictates that the friction invloved causes wear.

It is with respect to the elimination of any electrical sliding contact type device in a semiconductor power control circuit that the present invention is directed, so that there is no mechanical wear of any electrical component.

In eliminating electrical sliding contact type devices from a power control circuit, the elimination of conventional variable resistors is necessary. Thus in addition to the above object, it is a specific object to provide a semiconductor power control system that eliminates the necessity of any variable resistor component.

Further objects are to provide power control systems of the type described that provide full wave power control to a load, or half wave power control as may be desired, and systems that are adapted to employ any type of semiconductor power control switch.

Yet a further object of the invention is to provide a novel manual regulator means, and more particularly means for selectively controlling an electric current, especially adapted to be used in such a power control system, and which is characterized by the absence of any component that is subject to frictional wear. In conjunction with this object, a feature of the invention resides in the provision of a novel optical-electrical control means to selectively control an electrical current responsive to an external mechanical or manual input.

In accordance with the above objects, the invention provides a control system that employs any semiconductor power switch for controlling the power supplied to a load from an AC voltage source, wherein the conduction of the semiconductor switch is phase controlled during selected portions of the alternating cycles of the AC voltage source. The system includes a control portion wherein a control signal is applied to the semiconductor switching device at selected times during the alternating cycles of the AC voltage source to trigger the switching device and thus supply power to the load. More particularly, the semiconductor switching device is rendered conductive at selectively controllable times during the alternating cycles of the AC voltage source so that power is supplied to the load when the semiconductor switching device is in a conductive state; i.e. phase control. The control portion of the system generates the trigger signal in response to the conduction of a current, and includes means for controlling this current in a selectively variable manner so that the times during the alternating cycles of the AC voltage source that the trigger signal is generates is selectively controlled. All of this is well known and is not novel in and of itself.

The invention employs a novel manual input regulator that comprises a photoresponsive means through which current is conducted and an optical means for directing light thereon, in which the electrical characteristics of the photoresponsive means are varied as a function of the amount of light incident thereon from the optical means. Current conducted through the photoresponsive means is therefore a function of the amount of light incident thereon. This novel control means is adapted to vary the degree of optical coupling between the optical means and the photoresponsive means responsive to a manual input to allow selected amounts of light to strike the photoresponsive means. Thus a selectively variable control for controlling the time during the respective half cycles of the AC voltage supply when the control signal is applied to the semiconductor switching device is provided. As the manual input is changed, the resistance to current flow through the photoresponsive means is varied accordingly, the eliminating the necessity of the conventional electrical sliding contact type variable resistor.

Another important feature of the control system is that no more components are required than in a conventional system that employs a variable resistor of the electrical sliding contact type. Thus the cost of additional components is not incurred.

Many other objects, features and advantages of the invention will become readily apparent from the following detailed description thereof when taken in conjunction with the appended claims and the attached drawing wherein like reference numerals refer to like parts throughout the several figures, and in which:

Power control systems that employ semiconductor power switching devices control the power supplied to a load by selectively controlling the conduction of the switching device during the respective half cycles of the AC voltage supply, wherein the semiconductor switching device is interconnected with the AC voltage supply and the load so that power is supplied to the load during the time that the semiconductor power switch is conductive. This is commonly referred to as phase control. There are various types of semiconductor switching devices now employed for this purpose. Some are two terminal devices, wherein the two terminals constitute conduction electrodes therefor, and are caused to become conductive by the application of an electrical trigger signal applied to one of the conduction electrodes with reference to the other electrode. Other of the devices have a pair of conduction electrodes and a control electrode, whereby a trigger signal is applied to the control electrode to cause the device to become conductive. Still other devices are rendered conductive by other means, such as by optical radiation directed thereon, for example. In all cases, the semiconductor power switch is characterized by a normally high impedance between the conduction electrodes thereof and is caused to switch to a low impedance or conductive state upon the application of the trigger signal thereto in the presence of a voltage applied across the conduction electrodes that is sufficient to maintain the minimum holding current through the device after the device is rendered conductive. All of this is commonly known and constitutes no part of the invention in and of itself.

A control circuit portion of these systems generates a trigger signal that is applied to the semiconductor switching device, wherein the control circuit portion is interconnected to the AC voltage supply across the conduction electrodes of the switching device and operates responsive thereto. In almost all cases, a charging device is employed in conjunction with a voltage breakdown device, the latter of which is caused to conduct current upon the charging device attaining a predetermined minimum voltage to discharge the charging device therethrough. This causes the generation of the trigger signal applied to the semiconductor switching device. A charging circuit is provided in which the impedance of the charging circuit determines the time during the respective half cycles of the AC voltage supply that the charging device attains the predetermined minimum voltage to cause the generation of the trigger signal, thus effecting phase control. Again, all of this is well known and constitutes no part of the invention in and of itself. It is with reference to the charging path and the control of the impedance or charging time constant thereof that the present invention is directed.

Figure 1:
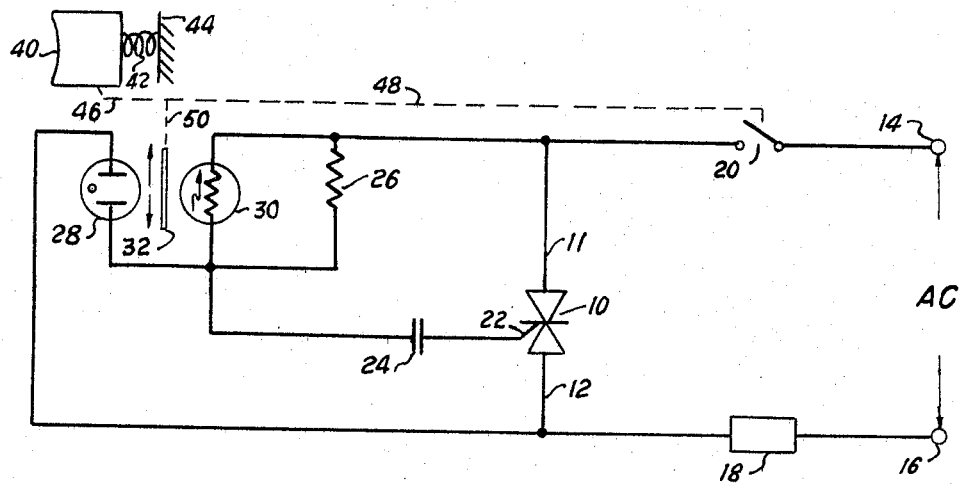
FIGURE 1 is a schematic diagram of one embodiment of the power control system of the invention for providing full wave power control to a load from an AC voltage source.

Referring to the schematic diagram of FIGURE 1, which represents one embodiment of the invention, a semiconductor switching device 10 is connected in series through its conduction electrodes 11 and 12 to a source of alternating voltage supply applied across terminals 14 and 16 and in series with a load 18 to which power is to be supplied. A main switch 20 is provided in series with these components, reference to which will be made later. Although it will be shown that any semiconductor power switching device can be employed in conjunction with the invention, the device 10 illustrated in FIGURE 1 comprises a symmetrical switch device having a control electrode 22, and in particular, is a Triac device so designated by the General Electric Company. This type of device is characterized by a high impedance to current flow in either direction through the conduction electrodes, but is switched to the low impedance state for conduction upon the application of the control signal to control electrode 22 in the presence of a voltage applied across the conduction electrodes sufficient to maintain the holding current when the device becomes conductive. This device is well known and will not be further described here.

The control circuit portion of the system comprises a capacitor 24 connected to the control electrode 22 at one terminal and at the other terminal to a set resistor 26 connected to one of the conduction electrodes 11 of the semiconductor switching device. An optical device 28 of the voltage breakdown type, such as a neon lamp, is connected to the interconnection of capacitor 24 and resistor 26 at one terminal and at the other terminal to the other conductional electrode of the semiconductor switching device. It will become apparent that capacitor 24 and lamp 28 are interchangeable. A photoresponsive element 30, such as a photocell, for example, is connected at one terminal to the interconnection of capacitor 24 and resistor 26, and at the other terminal to the first conduction electrode 11 of the semiconductor switching device. A mechanical shutter 32 is disposed between the neon lamp 28 and photocell 30 and is capable of being moved to different positions by manual operations, as will be described.

Assuming that main switch 20 is closed and the AC supply voltage is applied across terminals 14 and 16, no power will be supplied to load 18 until the semiconductor switching device 10 is rendered conductive. Referring to the graphical representation of the alternating supply voltage shown in FIGURE 2, voltage will build up during the positive half cycle across the switching element and cause capacitor 24 to be charged through set resistor 26 and the gate-cathode circuit of the semiconductor switching element, the rate of voltage build up on capacitor depending upon the time constant of this charging circuit. Assuming for present purposes that the shutter 32 completely blocks any light from striking photocell 30, the photocell will act as a very high impedance relative to the resistance of resistor 26, and thus does not affect the charging time constant. When the voltage across capacitor 24 attains the breakdown voltage of neon lamp 28, the latter will strike and go from a very high to a very low impedance. Upon this occurrence, capacitor 24 is discharged through the neon lamp, thus causing a large current to be injected into the control electrode 22 of the semiconductor switching device. The injected current into the control electrode constitutes the trigger signal that causes the semiconductor switching device to switch to its low impedance state, and this power to be supplied to the load. Upon the actuation of the neon lamp and discharge of the capacitor therethrough, the semiconductor power switch fires so that all of the line voltage is switched across the load, this removing for the remainder of the half cycle the voltage for charging capacitor 24. Thus the lamp turns on only momentarily to produce a light pulse, and then does not turn on again until the next half cycle. This is important in that the same amount of light is generated during each half cycle, as will be described in greater detail below.

Figure 2:
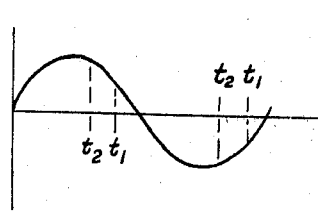
FIGURE 2 is a graphical representation of the alternating supply voltage illustrating phase control of the semiconductor power switch.

The values of the various components of the system are selected so that the capacitor 24 attains the minimum breakdown voltage of the neon lamp in the latter part of the half cycle of the alternating of voltage supply, at a time designated $t_1$ in FIGURE 2. The capacitor is similarly charged during both the positive and negative half cycles of the alternating supply voltage and reaches the minimum breakdown voltage of the neon lamp at a time $t_1$ during each half cycle. Once the semiconductor switching element has been rendered conductive, it will remain in a conductive state until the supply voltage is removed from the conduction electrodes thereof at the end of the half cycle. Consequently, the semiconductor switching element remains conductive from the time $t_1$ throughout the remaining portion of the respective half cycle, so that power is supplied to the load during this remaining portion of the half cycle.

It will be assumed now that shutter 32 is moved to a position between the neon lamp and the photocell so that a portion of the light from the lamp strikes the photocell when the lamp is caused to strike. One of the characteristics of the photocell 30 is that it possesses a memory, or is characterized by a relatively slow response time as compared to the time represented by a half cycle of the alternating voltage supply. More particularly, the photocell, once its resistance to current flow is reduced by directing light thereon, requires a time equivalent to several half cycles of the AC supply voltage before its resistance will again arise to its original value after the light has been removed.

With the shutter 32 in a position so that a portion of the light from the lamp strikes the photocell, the trigger signal will be generated and applied to the semiconductor switching element at the same time $t_1$ during the respective half cycles of the AC supply voltage for a few cycles until the response time of the photocell has elapsed to allow the resistance of the current flow thereof to be reduced to the steady state value determined by the amount of light incident thereon from the lamp during each half cycle. The reduction in resistance to current flow of the photocell will decrease the charging time constant of capacitor 24, since the photocell shunts the set resistor 26. The new position of shutter 32 effecting the reduction in the resistance of the photocell 30 allows capacitor 24 to be charged to the required breakdown voltage of neon lamp 28 more rapidly, which occurs at time $t_2$ during each half cycle of the AC supply voltage. Times $t_2$ therefore occur earlier in each half cycle so that the semiconductor switching device is caused to become conductive earlier during the respective half cycles. This causes power to be supplied to the load for longer periods of the respective half cycles. In this manner, phase control is effected by the simple manual input of adjusting shutter 32.

The relatively slow response time of the photocell 30 causes the resistance of the photocell to remain at the reduced value over several cycles once the light has been directed thereon. Thus capacitor 24 charges through the reduced resistance of the parallel combination of photocell 30 and set resistor 26. Should the response time of the photocell be fast, in the order of a half period of the AC supply voltage, its resistance would increase to its original value after the light pulse occurs each half cycle, causing undesired phasing back of the system. Should the shutter 32 be repositioned back to its initial position cuting off all of the light from the photocell, the resistance of the photocell will arise in the following few cycles to its original value.

Lamp 28 generates the same total amount of light each half cycle, regardless of the time from the beginning of the half cycle that the lamp is actuated. This is true since a single, identical light pulse is produced each half cycle and then the lamp is turned off. Should the lamp be allowed to continue to produce light throughout the remainder of the half cycle in addition to being turned on at a time during the half cycle dependent upon the position of shutter 32, or should the lamp produce several light pulses during each half cycle depending upon the shutter position, different total amounts of light would strike the photocell during successive half cycles for the same fixed shutter position. That is to say, the resistance of the photocell would continue to fall because of its relatively slow response time, which would cause the lamp to be turned on progressively sooner in the half cycle. Thus the integrated amount of light during successive half cycles would increase, and result in a regenerative system. This is avoided by the constant light pulse that is produced.

Although the various component values will be readily apparent from those skilled in the art, a few will be given for representative purposes. Assuming that the semiconductor switching device is a Triac type device designed for a conventional 120 v. AC supply voltage, a capacitor of about .05 microfarad used in conjunction with a NE2H neon lamp will cause proper operation of the Triac device. The set resistor 26 can be so chosen to provide the proper charging time constant to operate the Triac device in the latter part of the respective half cycles. A photocell which has a resistance range, when used in conjunction with the specified neon lamp, of from about 10 megohms to about 10,000 ohms is suitable for this circuit. It was also remarked that the photocell should have a response time which is relatively long as compared to the time elapsed during a single half cycle of the AC supply voltage. For conventional 60 cycle supply voltage, the half period is about 8.3 milliseconds. It has been found that a response time for the photocell of about three times this long, or about 25 milliseconds is sufficiently long, and thus a photocell of this characteristic is accordingly provided.

The control circuit just described is adapted for use for any apparatus requiring continuous power control and where the shutter can be mechanically or manually operated. For example, practically all power tools are now provided with solid state power controls in which the speed of the motor of the power tool is regulated by the extent to which the trigger on the power tool is depressed. A schematic representation of manual control by a trigger is shown in FIGURE 1, wherein a trigger 40 is spring biased from a stationary wall 44 by a spring 42, as is well known. A suitable mechanical coupling 46 is provided from the trigger to the main switch 20 and the shutter 32 by means of couplings 48 and 50, respectively. As the trigger is depressed to a small extent, coupling 48 causes main switch 20 to close so that the power circuit is operative. At the same time, shutter 32 is moved but is not necessarily moved to an extent allowing any light to be directed onto the photocell. Further depression of the trigger causes shutter 32 to be moved to positions of successively greater amounts of light striking the photocell. Obviously, complete depression of the trigger provides complete and direct coupling of the light from the neon lamp to the photocell.

Figure 3:
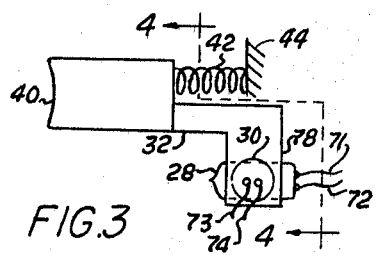
FIGURE 3 is a side elevational view of one embodiment of the manual regulator of the invention, and more particularly shows a manually operated shutter means for controllably selecting the amount of light incident on a photoresponsive means from an optical means.
Figure 4:
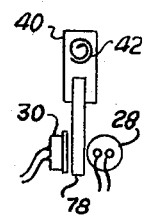
FIGURE 4 is an end elevational view taken through lines 4—4 of FIGURE 3.

A side elevational view of one embodiment of a manually operated trigger and shutter for the photocell and neon lamp is shown in FIGURE 3, and also in the end view of FIGURE 4, wherein such an arrangement is adaptable for use on most power tools that are hand operated. The shutter 32 comprises an extension rearward of the trigger, wherein the latter is spring biased by a spring 42 from a stationary wall 44 within the handle of the power tool. In this particular embodiment, the shutter comprises a downward extension 78 that is opaque to light, which extension is disposed between neon lamp 28 and photocell 30 when the trigger is in the non-depressed position, thus blocking all light from the photocell. Neon lamp 28 is provided with lead 71 and 72 for connection in the circuit of FIGURE 1, and similarly, photocell 30 is provided with lead 73 and 74. The lamp and photocell are mounted by any suitable means (not shown) in a stationary manner, whereby the shutter is movable relative thereto. As the trigger is depressed, proportionately greater amounts of light strike the photocell from the lamp, thus causing more power to be supplied to the load. Because of the straight front edge of the shutter, the amount of light striking the photocell is a substantially linear function of the position of the shutter.

Figure 5:
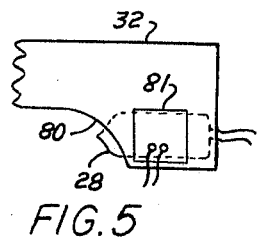
FIGURE 5 is a fragmentary view of another embodiment of a manual regulator comprising a contoured shutter.

A fragmentary, elevational view of a contoured or shaped shutter is shown in FIGURE 5, wherein the photocell 81 can be made square as shown. The downward extension 80 of the shutter that moves between the lamp and photocell has a front edge conforming to any desired curve to give the desired effect, such as the arc configuration shown. As the shutter is moved across the photocell, the increase in the amount of light is a nonlinear function of the position of the shutter. Since the photocell has a straight front edge, a complex mathematical function between the amount of light and shutter position is avoided, which complex function would exist for a round photocell used in conjunction with the contoured shutter. Obviously, any desired contour edge can be employed to yield the desired result.

Figure 6:
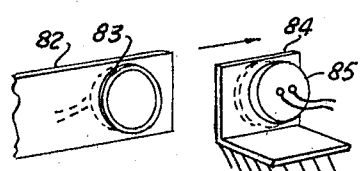
FIGURE 6 is a fragmentary perspective view of another embodiment of a manual regulator according to the invention which eliminates the necessity of a shutter.
Figure 7:
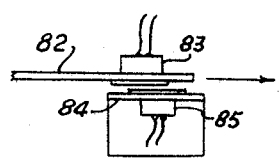
FIGURE 7 is a top view of the regulator shown in FIGURE 6.

A fragmentary, perspective view and a top view of another embodiment of the novel manual control means is shown in FIGURES 6 and 7, respectively, whereby the necessity of a shutter is obviated. In this instance, either one of the photocell or lamp 83 is mounted to the trigger mechanism 82 for movement therewith, and the other of the photocell and lamp 85 is mounted to a stationary member 84. The lamp and photocell are disposed in close proximity to each other, and light strikes only that part of the photocell that is directly opposite the lamp. As the trigger is depressed to a greater or lesser degree, greater or lesser optical coupling is achieved, providing a control means equivalent, in effect, to those described above having shutters. Thus a variable optical coupler is provided that requires no shutter.

Other variations of the optical coupling scheme can be employed. For example, both the photocell and lamp can be mounted in spaced apart relation for movement with the trigger mechanism, and moved along opposite sides of a fixed shutter. Other variations will also undoubtedly become apparent.

Figure 8:
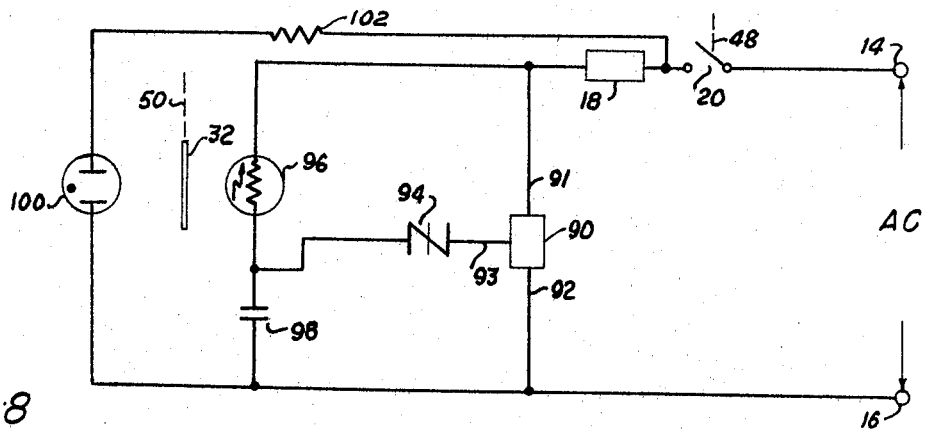
FIGURE 8 is an electrical schematic diagram of another embodiment of the power control system of the invention.

A variation of the power control system shown in FIGURE 1 is shown in the electrical schematic diagram of FIGURE 8, wherein this circuit is also adapted to provide full wave power control to the load. A semiconductor power switching element 90 having conduction electrodes 91 and 92 is connected across the AC supply voltage by means of the conduction electrodes. The semiconductor switching device also includes a control electrode 93 for controlling the conduction thereof. The particular type of semiconductor switching element is not specified and can be of any suitable type well known in the art. In this particular embodiment, a bilateral trigger diode 94, such as the Diac as specified by the General Electric Company, is connected to the control electrode 93 and is employed to trigger the semiconductor switching element. The bilateral trigger device is used in conjunction with a capacitor 98 connected to the other terminal thereof, the capacitor being connected to one of the conduction electrodes of the power switch. A charging path is provided through a photocell 96 connected between the interconnection of the capacitor and trigger diode, and the other conduction terminal of the semiconductor power switch. The triggering of the semiconductor power switch by the trigger diode is commonly understood, whereby switching is initiated at the specified trigger diode breakover voltage and current when the capacitor charges to the minimum required voltage.

A neon lamp 100 is connected across the AC voltage supply in series with a current limiting resistor 102, so that it is also connected across both the semiconductor power switch and the load 18. It will be seen in this embodiment that the neon lamp is turned on at the same time during each half cycle independent of the phasing of the power switch, and provides the same constant integrated amount of light each half cycle. Should the lamp be connected only across the semiconductor switch, it would be turned off when the switch fired, thus making the amount of light produced each half cycle phase dependent.

Photocell 96 again has relatively long response time and exhibits a relatively high impedance to current flow when all the light is blocked therefrom. As shutter 32, or other optical coupling means such as shown in FIGURE 6, is positioned to allow light to strike the photocell from the lamp 100, its impedance is reduced accordingly, thus allowing capacitor 98 to charge more rapidly to the breakover voltage of the bilateral trigger diode 94. Positioning of shutter 32 at positions allowing successively greater amounts of light to strike photocell 96 causes its impedance to be reduced accordingly, thus reducing the charging time constant for capacitor 98 and causing the semiconductor power switch to be fired earlier in the respective half cycle. Thus greater power is supplied to the load as the shutter is moved in this fashion to provide phase control of the system.

It will be seen in this circuit that the capacitor is discharged through the trigger diode 94 rather than through the lamp 100, but that the same phase control is achieved by a simple manual input.

Figure 9:
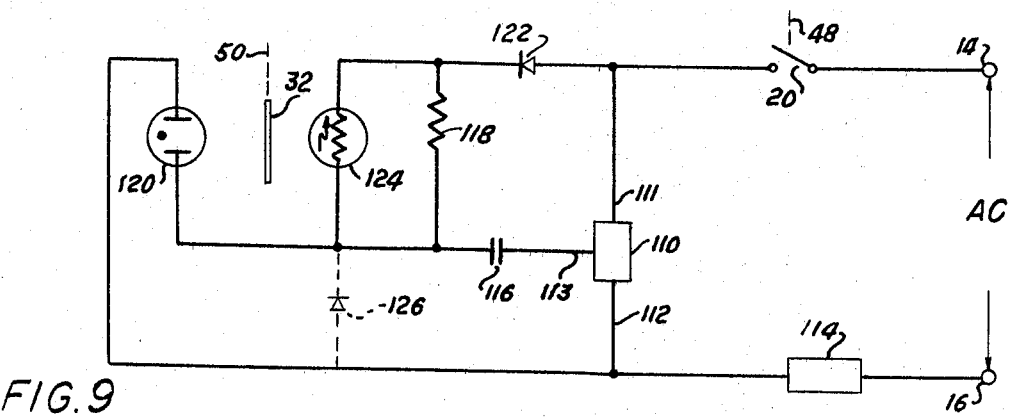
FIGURE 9 is an electrical schematic diagram of yet another embodiment of the invention for providing half wave power control to a load from a source of alternating voltage.

Another variation of the power control circuit is shown in the electrical schematic diagram of FIGURE 9, wherein this circuit is specifically designed to provide half wave power control, or selective triggering of the semiconductor power switch only during the positive or the negative half cycles. Again, any suitable asymmetrical semiconductor power switch 110, such as a semiconductor controlled rectifier, can be employed that includes a pair of conduction electrodes 111 and 112 connected across the AC supply voltage, and a control electrode 113. This circuit is very similar to the circuit shown in FIGURE 1 and includes a capacitor 116 connected at one terminal to the control electrode of the semiconductor power switch and the other terminal connected to one terminal of a neon lamp 120. The other terminal of the lamp is connected to the conduction electrode 112. A charging set resistor 118 is connected between the interconnection of the lamp and capacitor at one terminal and at the other terminal to the other conduction electrode 111 through a diode 122. The anode of the diode is connected to the anode or positive conduction electrode of the semiconductor power switch. A photocell 124 is connected to the interconnection of the lamp 120 and capacitor 116 at one terminal, and at the other terminal to the cathode of the diode 122. As earlier described, the shutter 32 is disposed between the lamp and photocell and is mechanically operated through connection 50. Alternatively, an optical coupler system that requires no shutter can be employed.

The operation of this circuit is the same as described with reference to FIGURE 1 with the exception that the semiconductor power switch is characterized by an ability to conduct in one direction only, and is triggered during the proper half cycle. The operation of the neon lamp 120 and photocell 124 is exactly the same as described with reference to FIGURE 1, as is the operation of shutter 32. During the positive half cycle of the AC voltage supply, diode 122 is forward biased so that triggering of these semiconductor power switch is effected at the proper time as determined by the position of shutter 32. During the negative half cycle of the AC voltage supply, diode 122 is reversed biased to prevent charging of capacitor 116 in the reverse direction, and this prevents actuation of the neon lamp. If the latter occurs early enough in the negative half cycle, which would be the case with the shutter open to a large extent, the lamp will fire more than once, depending upon the position of the shutter. Thus the amount of light striking the photocell during the negative half cycle will be phase dependent and relatively large as compared to the amount of light striking the photocell during the positive half cycle. And even though this amount of light during each negative half cycle will be constant for any fixed shutter position, it will tend to override what light is produced during the positive half cycle, thus greatly reducing the degree of control of the phasing of the system by the shutter position.

An alternate connection for the diode to serve the same purpose is shown in phantom as diode 126, whereby the diode is connected between the capacitor and the conduction terminal 112. In this connection, diode 122 can be eliminated, and diode 126 provides a clamping voltage for capacitor 116 during the negative half cycle of the supply voltage, which prevents firing of the lamp. During the positive half cycle of the voltage supply, diode 126 is reversed biased and has no effect.

Figure 10:
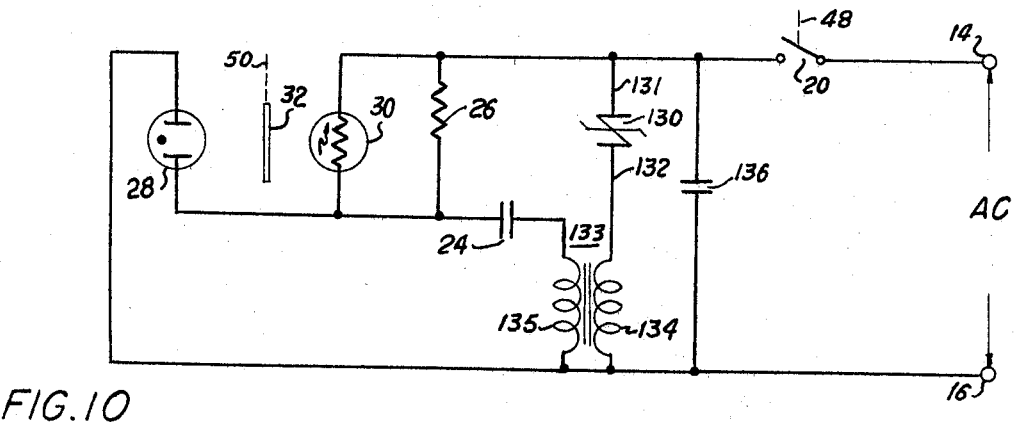
FIGURE 10 is an electrical schematic diagram of yet another embodiment of the invention that employs a two terminal semiconductor power control switch.

An electrical schematic diagram of a system that employs a two electrode semiconductor power switch is shown in FIGURE 10, whereby the power switch 130 has no separate control electrode and is connected across the supply voltage in series with the load 18 by means of its two conduction electrodes 131 and 132. As an example, a semiconductor symmetrical switch (SSS) is suitable for this purpose and is triggered to a conductive state by a voltage pulse applied to one of the conduction electrodes with respect to the other conduction electrode, all as is well known. To apply the trigger pulse to the device, the secondary 134 of a transformer 133 is connected in series with the device, and capacitor 24 is connected in series with the primary 135 of the transformer. A capacitor 136 is connected across the power switch and transformer secondary, so that the pulse is applied to the power switch when generated in the transformer secondary. The capacitor 136 can also be the distributive capacitance of the power switch itself. The rest of the circuit is connected as described with reference to FIGURE 1 and operates in the same manner. This circuit is shown to illustrate that two electrode power switches can be employed as well as three electrode switches.

The invention has been described with reference to several embodiments thereof, and many other modifications and substitutions that do not depart from the true invention will undoubtedly occur to those skilled in the art. Accordingly, it is intended that the invention be limited only as defined in the appended claims.

What is claimed is:

1. In a system for controlling the power supplied to a load from a source of AC voltage including a semiconductor switch means having a pair of conduction electrodes for interconnection with said source of AC voltage and said load, said switch means exhibiting a normally high impedance state between said pair of conduction electrodes and being switched to a low impedance state therebetween responsive to a trigger signal applied thereto in the presence of a voltage applied across said pair of conduction electrodes, control means comprising:
   (a) regulator means including (i) photoresponsive means through which a current is conducted, the magnitude of which controls the time of application of said trigger signal to said switch means in relation to the phase of said AC voltage, and (ii) optical means for directing light onto said photoresponsive means to control the magnitude of said current as a function of the amount of light incident thereon, said optical means comprising a voltage breakdown device exhibiting a normally high impedance state that is rendered conductive in a low impedance state to discharge a charging means therethrough when said voltage developed across said charging means obtains a predetermined minimum magnitude and;
   (b) charging means connected to said photoresponsive means and said optical means and across which a voltage is developed responsive to the charging thereof by said current conducted through said photoresponsive means, whereby said trigger signal is generated upon the discharge of said charging means.

2. Control means as set forth in claim 1 wherein said charging means is connected across said semiconductor switch means and is charged responsive to the voltage applied across said pair of conduction terminals, whereby said charging means cannot be charged to said predetermined minimum magnitude during the remaining portion of any half cycle of said AC voltage after said semiconductor switch means has been switched to said low impedance state.

3. Control means as set forth in claim 1 wherein said regulator means includes manually operable means for selectively varying the degree of optical coupling between said optical means and said photoresponsive means to selectively vary the amount of light incident on said photoresponsive means.

4. A system as set forth in claim 1 wherein said semiconductor switch means comprises a device adapted to conduct during both the positive and negative half cycles of said AC supply voltage when said trigger signal is applied thereto.

5. Control means as set forth in claim 1 wherein said semiconductor switch means comprises an asymmetrical device adapted to conduct only during the half cycles of one polarity of said AC supply voltage, and said control means includes means to prevent the charging of said charging means during the half cycles of the opposite polarity of said AC supply voltage.

6. In a system for controlling the power supplied to a load from a source of AC voltage including a semiconductor switch means having a pair of conduction electrodes for interconnection with said source of AC voltage and said load, said switch means exhibiting a normally high impedance state between said pair of conduction electrodes and being switched to a low impedance state therebetween responsive to a trigger signal applied thereto in the presence of a voltage applied across said pair of conduction electrodes, control means comprising:
   (a) photoresponsive means through which a current is conducted, the magnitude of which controls the time of application of said trigger signal to said switch means in relation to the phase of said AC voltage,
   (b) optical means for directing light onto said photoresponsive means to control the magnitude of said current as a function of the amount of light incident thereon,
   (c) a voltage breakdown device connected to said photoresponsive means,
   (d) charging means connected to said photoresponsive means and said voltage breakdown device and across which a voltage is developed responsive to charging thereof by said current conducted through said responsive means.

7. Control means as set forth in claim 6 wherein said optical means is connected across said semiconductor switch means and said load.

8. Control means as set forth in claim 6 wherein said semiconductor switch means comprises a device adapted to conduct during both the positive and negative half cycles of said AC supply voltage when said trigger signal is applied thereto.

9. Control means as set forth in claim 6 wherein said semiconductor switch means comprises an asymmetrical device adapted to conduct only during the half cycles of one polarity of said AC supply voltage, and said control means includes means to prevent the charging of said charging means during the half cycles of the opposite polarity of said AC supply voltage.

10. In a system for controlling the power supplied to a load from a source of AC voltage including a semiconductor switch means having a control electrode and a pair of conduction electrodes for interconnection with said source of AC voltage and said load, said switch means exhibiting a normally high impedance state between said pair of conduction electrodes and being switched to a low impedance state therebetween responsive to a trigger signal applied thereto in the presence of a voltage applied across said pair of conduction electrodes, control means comprising:
   (a) regulator means including (i) photoresponsive means through which a current is conducted, the magnitude of which controls the time of application of said trigger signal to said switch means in relation to the phase of said AC voltage (ii) optical means for directing light onto said photoresponsive means to control the magnitude of said current as a function of the amount of light incident thereon, and (iii) manually operable means for selectively varying the degree of optical coupling between said optical means and said photoresponsive means to selectively vary the amount of light incident on said photoresponsive means, (b) a capacitor serially interconnected with said control electrode and connected to said photoresponsive means across which a voltage is developed responsive to charging thereof by said current conducted through said photoresponsive means, said trigger signal being generated by the discharge of said capacitor, and (c) a resistor connecting in shunting relation with said photoresponsive means, said optical means comprising a voltage breakdown device connected to said capacitor which normally exhibits a high impedance state in which no light is generated and which is rendered conductive in a low impedance state to generate light and to discharge said capacitor therethrough when the voltage developed across said capacitor attains a predetermined minimum magnitude and which breakdown device returns to the high impedance state upon the discharge of said capacitor to drop the voltage thereacross to a minimum cut-off magnitude.

11. In a system for controlling the power supplied to a load from a source of AC voltage including semiconductor switch means having a pair of conduction electrodes for interconnection with said source of AC voltage and said load, said switch means exhibiting a normally high impedance state between said pair of conduction electrodes and being switched to a low impedance state therebetween responsive to a trigger signal applied thereto in the presence of a voltage applied across said pair of conduction electrodes and having a control electrode to which said trigger signal is applied;

(a) control means interconnected with said source of AC voltage for applying said trigger signal to said switch means, including regulator means comprising (i) photoresponsive means through which a current is conducted, the magnitude of which controls the time of application of said trigger signal to said switch means in relation to the phase of said AC voltage, (ii) optical means for directing light onto said photoresponsive means to control the magnitude of said current as a function of the amount of light incident thereon, said optical means connected across both said load and said switch means, (iii) a capacitor connected to said photoresponsive means across which a voltage is developed responsive to charging thereof by said current conducted through said photoresponsive means (iv) a voltage breakdown device connected to said capacitor which exhibits a normally high impedance state that is rendered conductive in a low impedance state to discharge said capacitor therethrough when the voltage developed across said capacitor attains a predetermined minimum magnitude, said voltage breakdown device and said capacitor being serially interconnected with said control electrode to supply a trigger signal generated upon the discharge of said capacitor to said control electrode, and (b) manually operable means for selectively varying the degree of optical coupling between said optical means and said photoresponsive means to selectively vary the amount of light incident on said photoresponsive means.

References Cited

UNITED STATES PATENTS

| 2,477,208 | 7/1949 | Rouy | 250—234 X |
| 3,038,083 | 6/1962 | Lunzer | 250—239 X |
| 3,145,304 | 8/1964 | Bostrom et al. | 318—480 X |
| 3,215,849 | 11/1965 | Golden | 250—234 |
| 3,230,421 | 1/1966 | Davis | 250—214 X |
| 3,317,789 | 5/1967 | Nuckolls | 323—22 X |
| 3,320,437 | 5/1967 | Myers | 307—305 |
| 3,348,131 | 10/1967 | Banks | 23—22 |

JOHN F. COUCH, Primary Examiner

A. D. PELLINEN, Assistant Examiner

U.S. Cl. X.R.

250—214, 221; 307—305; 315—156; 318—313; 323—22, 24, 36